(12) United States Patent
Pearson et al.

(10) Patent No.: US 9,268,948 B2
(45) Date of Patent: Feb. 23, 2016

(54) SECURE ACCESS ENFORCEMENT PROXY

(71) Applicants: Adrian Pearson, Hillsboro, OR (US); Christopher Thornburg, Gilbert, AZ (US); Raymond Ng, Fremont, CA (US); Christopher Ruesga, Chandler, AZ (US); Steve Brown, Phoenix, AZ (US); Dmitrii Loukianov, Chandler, AZ (US); Ziv Kfir, Yavne (IL); Barak Hermesh, Pardes Hana (IL)

(72) Inventors: Adrian Pearson, Hillsboro, OR (US); Christopher Thornburg, Gilbert, AZ (US); Raymond Ng, Fremont, CA (US); Christopher Ruesga, Chandler, AZ (US); Steve Brown, Phoenix, AZ (US); Dmitrii Loukianov, Chandler, AZ (US); Ziv Kfir, Yavne (IL); Barak Hermesh, Pardes Hana (IL)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 13/924,718

(22) Filed: Jun. 24, 2013

(65) Prior Publication Data
US 2014/0380403 A1 Dec. 25, 2014

(51) Int. Cl.
| | | |
|---|---|---|
| G06F 17/00 | (2006.01) | |
| G06F 21/60 | (2013.01) | |
| G06F 21/57 | (2013.01) | |
| G06F 21/74 | (2013.01) | |
| G06F 21/76 | (2013.01) | |
| G06F 21/85 | (2013.01) | |

(52) U.S. Cl.
CPC ............... *G06F 21/60* (2013.01); *G06F 21/57* (2013.01); *G06F 21/74* (2013.01); *G06F 21/76* (2013.01); *G06F 21/85* (2013.01); *G06F 2221/2111* (2013.01)

(58) Field of Classification Search
CPC ...................................................... G06F 21/85
See application file for complete search history.

(56) References Cited

U.S. PATENT DOCUMENTS

| | | | | |
|---|---|---|---|---|
| 7,716,720 | B1* | 5/2010 | Marek et al. ...................... | 726/2 |
| 8,683,114 | B2* | 3/2014 | Zbiciak et al. .................. | 711/103 |
| 2002/0091826 | A1* | 7/2002 | Comeau et al. ............... | 709/226 |
| 2002/0129274 | A1* | 9/2002 | Baskey et al. ................. | 713/201 |
| 2003/0014521 | A1 | 1/2003 | Elson et al. | |
| 2005/0033980 | A1* | 2/2005 | Willman et al. .............. | 713/200 |
| 2005/0223382 | A1* | 10/2005 | Lippett ......................... | 718/103 |
| 2009/0240874 | A1* | 9/2009 | Pong ............................. | 711/105 |
| 2010/0121893 | A1 | 5/2010 | Uhrhane et al. | |
| 2010/0228989 | A1 | 9/2010 | Neystadt et al. | |
| 2012/0143583 | A1* | 6/2012 | Huang et al. ................... | 703/14 |

(Continued)

FOREIGN PATENT DOCUMENTS

| | | |
|---|---|---|
| EP | 1209551 A2 | 5/2002 |
| EP | 1309906 B1 | 7/2008 |

OTHER PUBLICATIONS

No stated author; Intel Virtualization Technolgy for Directed I/O; Oct. 2014; Retrieved from the Internet <URL:.intel.com/content/dam/www/public/us/en/documents/product-specifications/vt-directed-io-spec.pdf>; pp. 1-272 as printed.*

(Continued)

*Primary Examiner* — Michael Chao
(74) *Attorney, Agent, or Firm* — Lowenstein Sandler LLP

(57) ABSTRACT

Efficient architecture for a secure access enforcement proxy is described. The proxy interfaces with multiple subsystems and multiple shared resources. The proxy identifies an original transaction command being sent from one of the subsystems to one of the shared resources, identifies a policy corresponding to the subsystem, performs an action pertaining to the original transaction command based on the policy, and sends a response to the subsystem based on the action.

24 Claims, 9 Drawing Sheets

(56) References Cited

U.S. PATENT DOCUMENTS

2013/0227641 A1* 8/2013 White et al. .................. 726/1
2013/0312117 A1* 11/2013 Sapp et al. .................. 726/30
2014/0258708 A1* 9/2014 Shekhar et al. ............... 713/155

OTHER PUBLICATIONS

International Search Report for PCT/US2014/042236, mailed Oct. 2, 2014.

* cited by examiner

SECURE ACCESS ENFORCEMENT PROXY

TECHNICAL FIELD

Embodiments described herein generally relate to processing devices and, more specifically, relate to a secure access enforcement proxy.

BACKGROUND

Advanced system-on-chips (SOCs) and processors can incorporate multiple subsystems on a single die. The control of these subsystems is typically divided into discrete areas. The subsystems may access shared resources, such as a flash memory controller, power management controller, etc. on the SOC/processor. Some software that executes on the SOC/processor may have stringent requirements. For example, a conditional access (CA)/Pay Television (Pay TV) provider may place requirements and/or a certification process on the software, which executes on the SOC/processor, for accessing premium digital content and/or television content. In particular, conditional access providers may be concerned that a non-certified subsystem may access a portion of the certified subsystems' flash memory area when performing read/write access to the flash memory and either launch a Denial of Service attack (DOS) or read confidential portions of the flash memory.

Traditional solutions may isolate shared resources (e.g., flash memory) by simply placing another controller for the shared resource and/or another device in the system, such that each subsystem may have access to its own resource. Such conventional solutions typically greatly increase the cost of the platform, which may make the platform unmarketable. Some other conventional solutions may include an interface for a shared resource that places all of the necessary commands for an access operation into a single command. Such solutions generally do not allow interpretation or modification of the command. Some other conventional solutions may include a dual head controller, which allows each head to independently support devices. Each head controller can issue transactions atomically, which does not allow for interference or customization of the transaction.

DESCRIPTION OF EMBODIMENTS

Technologies for a system-on-chip (SOC) security access enforcement proxy are described. The security access enforcement proxy can emulate and arbitrate the behavior of resources (e.g., hardware units) that are shared between independent subsystems of the SOC. By emulating the shared hardware units in the SOC, the security access enforcement proxy can be implemented in a SOC with minimal change to existing software. The security access enforcement proxy can store policies for the SOC subsystems and can add security features to the SOC for access transactions made by the subsystems to the shared resources based on the policies. For example, the security access enforcement proxy can validate access (e.g., read/write) to the shared hardware units (e.g., enabling read access for a particular subsystem to particular shared resources and disabling write access). In another example, the security access enforcement proxy may change the data pertaining to a transaction (e.g., by encrypting data, compressing data, etc.). The security access enforcement proxy can also add power management features to the SOC.

Figure 1:
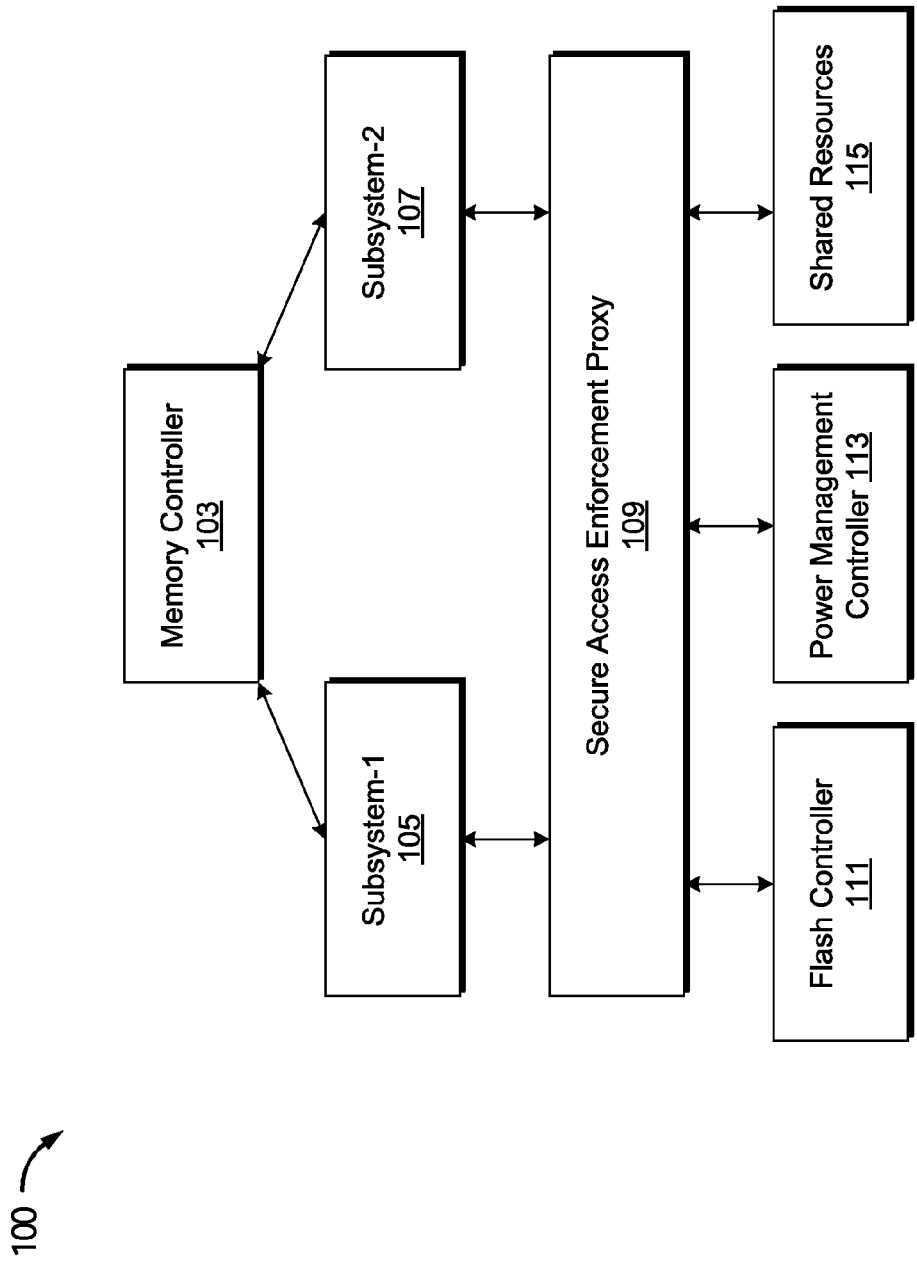
FIG. 1 is a block diagram of one embodiment of a system-on-chip (SOC) that includes a security access enforcement proxy for securing transactions for shared resources.

FIG. 1 is a block diagram of an embodiment of a SOC 100 design in accordance with the present disclosure. The SOC 100 can include multiple subsystems. For example, the SOC 100 may include Subsystem-1 105 and Subsystem-2 107. The SOC 100 can include multiple shared resources, which can be shared amongst the multiple subsystems. For example, the SOC 100 can include, and is not limited to, a flash controller 111, power management controller 113, and other shared resources 115 (e.g., GPIO (general purpose input/output), hardware for mutual exclusion (mutex), reset control, etc.).

The multiple subsystems (e.g., Subsystem-1 105, Subsystem-2 107) can access the shared resources. For example, the multiple subsystems may request read/write access to the flash memory controller 111, may have messaging ability to the power management controller 113, etc. The SOC 100 can include a secure access enforcement proxy 109 to interface between the multiple subsystems and the shared resources to isolate portions of the shared resources. The secure access enforcement proxy 109 can intercept original access transaction commands (e.g., read/write commands) that are issued by the subsystems 105,107 to the shared resources (e.g., flash memory controller 111, power management controller 113, shared resources 115) and can create replacement access transaction commands based on the policies applied to the subsystems 105,107. The secure access enforcement proxy 109 can store security policies for the various subsystems 105,107. The secure access enforcement proxy 109 can send the replacement access transactions to the shared resources.

Figure 2:
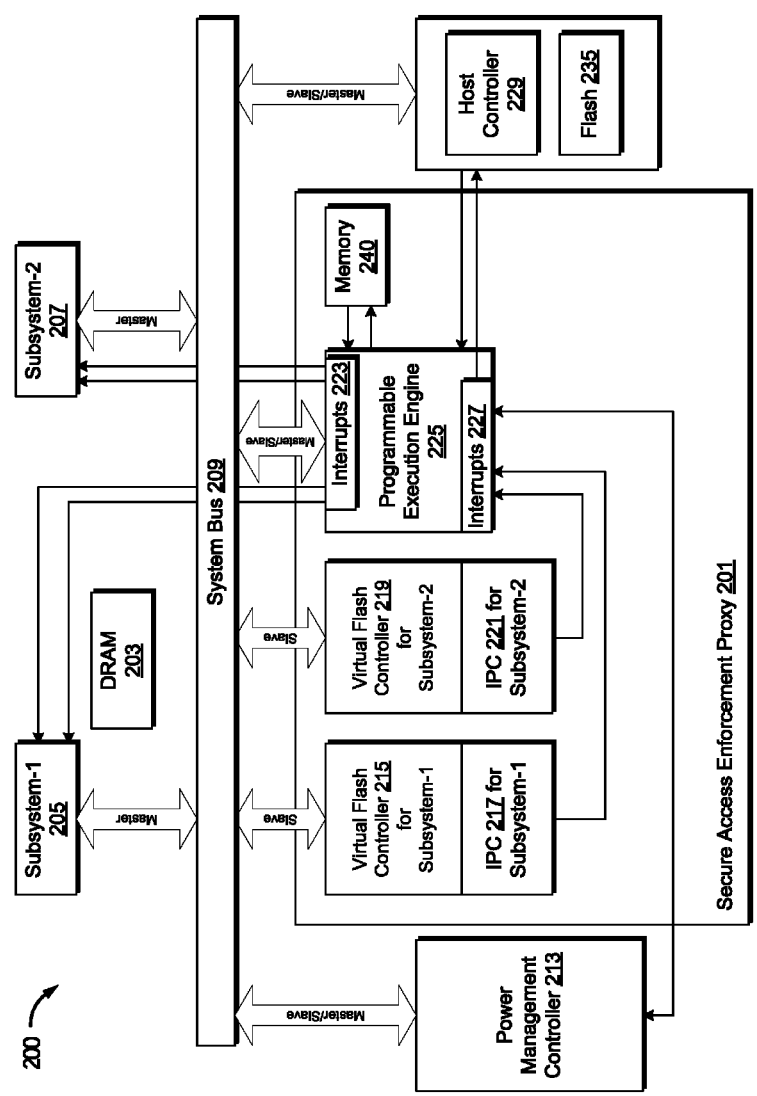
FIG. 2 is a block diagram of one embodiment of a SOC that includes a security access enforcement proxy for securing transactions for shared resources.

FIG. 2 is a block diagram of an embodiment of a system on-chip (SOC) 200 design in accordance with the present disclosure. The SOC 200 can include multiple subsystems (e.g., Subsystem-1 205, Subsystem-2 207), memory (e.g., DRAM 203), a system bus 209, shared resources, and a secure access enforcement proxy 201.

The shared system resources can perform critical system tasks, for example, and not limited to, storing critical program code and data and performing critical actions (e.g., read, write, power management, etc.). Examples of shared resources can include, and are not limited to, flash memory, flash memory controller, power management, GPIO, hardware mutex, reset control, internal non-volatile memory, fuses, etc.

The subsystems 205,207 can be mastering agents, which can be trusted agents or non-trusted agents. An agent could be a programmable unit, such as, and not limited to, a microprocessor, or a dedicated hardware unit, such as a DMA engine. The untrusted agents could be any agent that is capable of generating a write or read transaction command. In one embodiment, the secure access enforcement proxy 201 is a device that is secure from the untrusted agents.

The secure access enforcement proxy 201 can include a processor to execute a programmable execution engine 225 and to handle interrupts 223,227 to interpret transaction commands being sent by the software of the mastering agents to the shared resources. For example, the SOC 200 may be designed for a cable modem device and/or a gateway device and may incorporate many requirements of DOCSIS (Data Over Cable Service Interface Specification), conditional access termination, transcription, multiple TCP/IP connections, wired and wireless connections, and mass storage for DVR, telecommunications, and other communication interfaces onto a single die. Subsystem-1 205 may be a DOCSIS subsystem to control the cable modem and telephony portions of the SOC 200. Subsystem-2 207 may be an x86 processor subsystem to perform TCP/IP, content decryption, transcription, and link agreement with downstream devices.

The secure access enforcement proxy 201 can include a programmable general purpose execution engine 225 (e.g., processor). The programmable general purpose execution engine 225 can include configurable attributes. The programmable general purpose execution engine 225 can manage routing interrupts 223 from the subsystems and interrupts 223 from the shared resources.

The secure access enforcement proxy 201 can include one or more sets of hardware registers to create virtual controllers (e.g., virtual flash controller 215, virtual flash controller 219, etc.). In one implementation, a set is a 256-byte register. The secure access enforcement proxy 201 can include a register set for each subsystem (e.g., Subsystem-1 205, Subsystem-2 207). The secure access enforcement proxy 201 can include one or more sets of registers to create an inter-processor communication (IPC) (e.g., IPC 217, IPC 221) interface for each subsystem. For example, interrupts from the power management controller 213, the virtual flash controller 215, the virtual flash controller 219, the flash host controller 229, and flash memory device 235 may be routed into the programmable general purpose execution engine 225. For example, during a boot sequence of an application processor, the master/slave communication channels between the subsystems (e.g., Subsystem-1 205, Subsystem-2 207) and the shared resources (e.g., flash controller 223, power management controller 213) can be removed such that the subsystems (e.g., Subsystem-1 205, Subsystem-2 207) do not have direct access to the shared resources (e.g., flash controller 223, power management controller 213). During the boot sequence, communications between the subsystems (e.g., Subsystem-1 205, Subsystem-2 207) and the shared resources (e.g., flash controller 223, power management controller 213) is routed via the virtual controllers (e.g., virtual flash controller 215, virtual flash controller 219) for the subsystems.

The secure access enforcement proxy 201 can include firmware to execute in the programmable general purpose execution engine 225. The secure access enforcement proxy 201 can include memory 240 to store policies for the subsystems. The policy for a subsystem may specify for example, and not limited to, which shared resources can be accessed by the subsystem, whether data should be encrypted, the encryption algorithm that should be used, whether data should be compressed, the compression algorithm that should be used, whether the data at a shared resource should be isolated for the subsystem, the size of the shared resource that should be allocated to the subsystem for isolation, etc. The policies may be provided by the manufacturer of the subsystem.

The secure access enforcement proxy 201 can include a set of configurable security attributes and can assign different security attributes to the subsystems 205,207. The security attributes for a subsystem can represent the policies of the subsystem. For example, the secure access enforcement proxy 201 can specify a set of security attributes for Subsystem-1 indicating that Subsystem-1 can have read and write access to a portion of the physical space of the flash memory device 235 and may specify an address range to isolate in the flash memory device 235 for Subsystem-1. The security attributes can include a subsystem identifier, which each subsystem can include in an access (e.g., read/write) transaction request being sent to a shared resource. The secure access enforcement proxy 201 can use the subsystem identifier to identify which subsystem is making an access (e.g., read, write) request.

The security access enforcement proxy 201 can use the configurable security attributes for the subsystems to emulate, arbitrate, validate and/or translate the behavior of the shared resources for the individual subsystems. For example, the secure access enforcement proxy 201 can emulate flash memory interfaces to each subsystem 205,207. For example, the secure access enforcement proxy 201 can include a virtual flash controller 215 for Subsystem-1 205 and a virtual flash controller 219 for Subsystem-2.

In one embodiment, the secure access enforcement proxy 201 is a multi-headed flash controller, power management intermediary, and generic system wide proxy agent that can be isolated from multiple subsystems after initialization and/or configuration.

In one embodiment, the secure access enforcement proxy 201 executes while the one or more of the subsystems (e.g., x86 subsystem) is in a suspend state and can allow access to one or more subsystems (e.g., DOCSIS subsystem) while the one or more subsystems are in the suspended state. In one embodiment, the secure access enforcement proxy 201 continues to operate securely in a low power environment when one or more of the subsystems are disabled.

In one embodiment, the secure access enforcement proxy 201 is coupled to at least one cache to cache various stages of multi-stage transactions to interpret the content and guarantee that the transactions to critical resources are atomic and have no dependency on the previous history of accesses.

Figure 3:
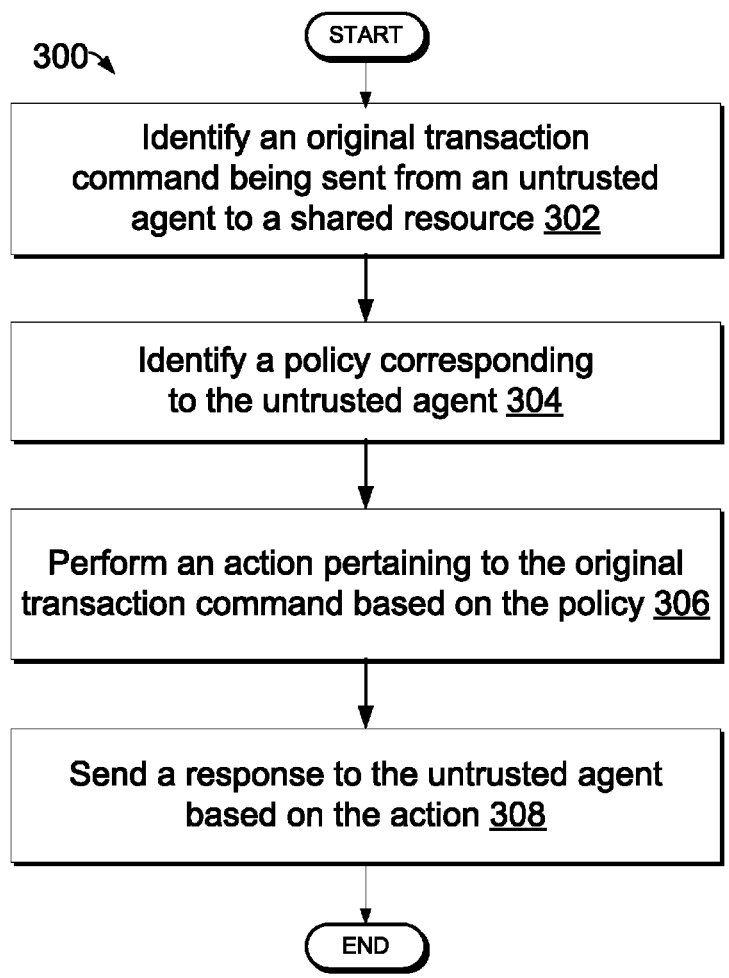
FIG. 3 is a flow diagram illustrating a method for securing transactions for shared resources using a secure access enforcement proxy according to an embodiment.

FIG. 3 is a flow diagram of method 300 according to some embodiments. Method 300 may be performed by processing logic that may comprise hardware (e.g., circuitry, dedicated logic, programmable logic, microcode, etc.), software (such as instructions run on a processing device), firmware or a combination thereof. In one embodiment, method 300 is performed by a secure access enforcement proxy 109 of FIG. 1. In another embodiment, the method 300 is performed by the secure access enforcement proxy 201 of FIG. 2.

Referring to FIG. 3, the method 300 begins by the proxy identifying an original transaction command that is being sent from an untrusted agent to a shared resource (block 302). For example, Subsystem-1 may send a write data request to the flash memory device. During a boot process of an application processor, the direct access of the subsystems to the shared resources can be removed, and the subsystems can be configured to route communications to the shared resources to the proxy. For example, the proxy may include a virtual flash controller for Subsystem-1 to receive the write data request from Subsystem-1. The proxy identifies a policy that corresponds to the untrusted agent (block 304). The policy can be related to access control and/or data modification (e.g., encryption, compression, isolation, etc.) for the transaction for the untrusted agent. The policy can be stored by memory in the proxy. The proxy can use an agent identifier that is included in the original transaction command to identify the policy that corresponds to the untrusted agent. In one embodiment, the policies are set by the manufacturer of the untrusted software agents. The proxy can be coupled to a trusted subsystem (e.g., firmware) that boots first and provides the proxy the policies of the untrusted agents. In another embodiment, the proxy is hard-coded with one or more policies that correspond to the untrusted agents.

The proxy performs an action pertaining to the original transaction command based on the policy (block 306). Examples of actions can include, and are not limited to, determining whether to allow the untrusted agent access to a shared resource, denying the untrusted agent access to the shared resource, allowing the untrusted agent access to the shared resource, isolating data of the shared resource for the untrusted agent, certifying the untrusted agent, encrypting data relating to the shared resource for the transaction, compressing data relating to the shared resource for the transaction, etc. The policy for the untrusted agent can specify the encryption algorithm, compression algorithm, etc. that the processor should use.

In one embodiment, the proxy intercepts the original transaction command, creates a replacement transaction command based on the policy, and sends the replacement transaction command to the shared resource. The proxy can send the replacement command to the shared resource via an IPC for the subsystem, an interrupt handler, and programmable execution engine in the proxy. In one embodiment, the processor receives a response from the shared resource and sends a response to the untrusted agent (block 308). For example, the proxy processor may receive a response and may send the response to the untrusted agent. One embodiment of the proxy creating a replacement response based on the policy and sending the replacement response to the untrusted agent is described in greater detail below in conjunction with FIG. 4.

Figure 4:
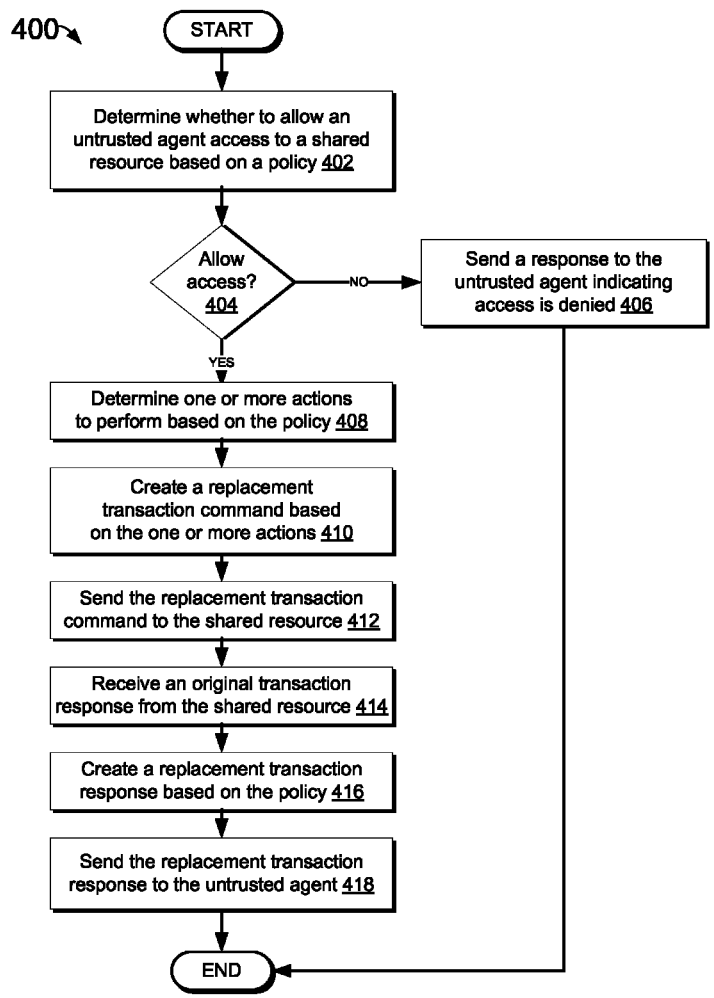
FIG. 4 is a flow diagram illustrating a method for securing transactions for shared resources using a secure access enforcement proxy according to an embodiment.

FIG. 4 is a flow diagram of method 400 according to some embodiments. Method 400 may be performed by processing logic that may comprise hardware (e.g., circuitry, dedicated logic, programmable logic, microcode, etc.), software (such as instructions run on a processing device), firmware or a combination thereof. In one embodiment, method 400 is performed by a secure access enforcement proxy 109 of FIG. 1. In another embodiment, the method 400 is performed by the secure access enforcement proxy 201 of FIG. 2.

Referring to FIG. 4, the method 400 begins by the proxy determining whether to allow an untrusted agent access to a shared resource based on a policy (block 402). The proxy can be coupled to firmware that stores the policy for the untrusted agent. The policy may specify, for example, that the untrusted agent has read and write access to a flash memory device. The proxy may determine that the untrusted agent is requesting write access to the flash memory device and may determine that the untrusted is permitted write access to the flash memory device. If the untrusted agent is not allowed access, the proxy sends a response to the untrusted indicating that access to the shared resource is denied (block 406).

If the untrusted agent is allowed access, the proxy determines one or more actions to perform based on the policy (block 408). The policy may specify for example, and not limited to, whether data should be encrypted, the encryption algorithm that should be used, whether data should be compressed, the compression algorithm that should be used, whether the data at a shared resource should be isolated for the subsystem, the size of the shared resource that should be allocated to the subsystem for isolation, etc.

For example, the proxy can translate virtual locations of a shared resource to physical locations of the shared resource. For example, the proxy may identify an original transaction command from the untrusted agent (e.g., Subsystem-1) being sent to a flash memory controller for access to flash memory at address 0. Another untrusted agent (e.g., Subsystem-2), may also send an original transaction command to the flash memory controller for access to flash memory at the same address 0. The proxy can emulate flash memory at address 0 at different physical addresses of the flash memory device for each subsystem (e.g., Subsystem-1, Subsystem-2). The proxy creates a replacement transaction command based on the one or more actions (block 410), and sends the replacement transaction command to the shared resource (block 412). For example, the proxy can create a replacement transaction command using a different flash memory address to translate the original request for address 0 for Subsystem-1 to a different physical address of the flash memory device. The proxy can include sets of hardware registers to emulate flash memory regions for the subsystems using different physical areas of the flash memory which do not collide with each other. The transactions of one subsystem (e.g. Subsystem-1) should not cause any corruption on another subsystem's (e.g., Subsystem-2) transactions.

The proxy receives an original transaction response from the shared resource (block 414) and, in one embodiment, creates a replacement transaction response (block 416). In one embodiment, the proxy creates a replacement transaction response based on the policy. For example, the proxy can emulate the responses back to the subsystem by changing the size of the shared resource in the transaction response that is to be sent to the untrusted agent. For example, the proxy can decrease the size of the shared resource in the transaction response such that the untrusted agent is aware of a physical area of the shared resource that is much smaller than the actual physical area of the shared resource. The proxy can emulate the features of a hardware interface of a critical shared resource to allow the original untrusted agent software/hardware to run unmodified or with very little modification. The proxy can emulate exact features and/or modified features of the hardware interface of a critical shared resource. The proxy can emulate multiple hardware interfaces of critical shared resources. The proxy can emulate at least one hardware interface of at least one shared resource for each untrusted agent for exclusive use for the untrusted agent. The proxy can implement a different access policy per virtual interface.

The proxy sends the replacement transaction response to the untrusted agent (block 418). The untrusted agent can use the replacement transaction response to complete the transaction.

Figure 5:
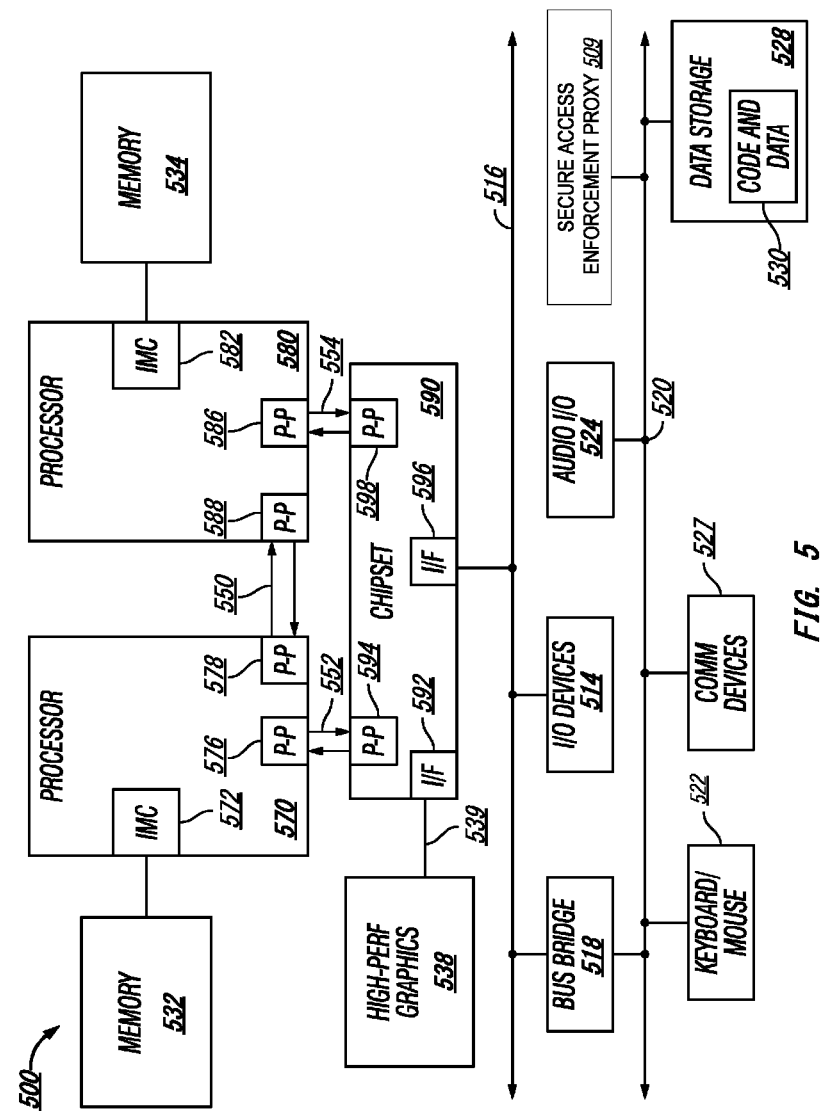
FIG. 5 is a block diagram of a system in accordance with an embodiment of the present disclosure.

FIG. 5 is a block diagram of a system 500 in accordance with an embodiment of the present invention. As shown in FIG. 5, multiprocessor system 500 is a point-to-point interconnect system, and includes a first processor 570 and a second processor 580 coupled via a point-to-point interconnect 550.

While shown with only two processors 570, 580, it is to be understood that the scope of the present invention is not so limited. In other embodiments, one or more additional processors may be present in a given processor.

Processors 570 and 580 are shown including integrated memory controller units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Further, a secure access enforcement proxy 509 may be coupled to the second bus 520. Note that other architectures are possible. For example, instead of the point-to-point architecture of FIG. 5, a system may implement a multi-drop bus or other such architecture.

Figure 6:
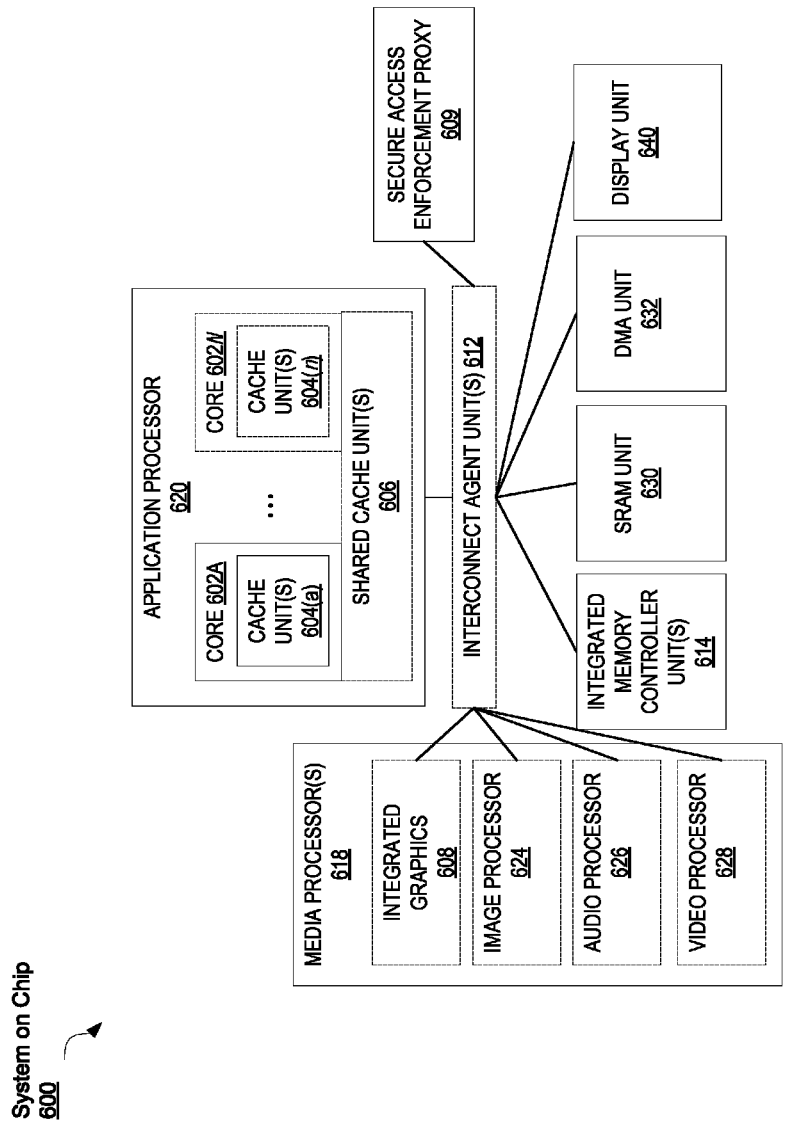
FIG. 6 is a block diagram of a SOC in accordance with an embodiment of the present disclosure.

FIG. 6 is a block diagram of a SOC 600 in accordance with an embodiment of the present disclosure. Dashed lined boxes are optional features on more advanced SOCs. In FIG. 6, an interconnect agent unit(s) 612 is coupled to: an application processor 620 which includes a set of one or more cores 602A-N and shared cache unit(s) 606; a processor 607 executing a secure access enforcement proxy 609; an integrated memory controller unit(s) 614; a set or one or more media processors 618 which may include integrated graphics logic 608, an image processor 624 for providing still and/or video camera functionality, an audio processor 626 for providing hardware audio acceleration, and a video processor 628 for providing video encode/decode acceleration; an static random access memory (SRAM) unit 630; a direct memory access (DMA) unit 632; and a display unit 640 for coupling to one or more external displays.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof.

In some embodiments, one or more of the cores 602A-N are capable of multi-threading.

The system agent 610 includes those components coordinating and operating cores 602A-N. The system agent unit 610 may include for example a power control unit (PCU) and a display unit 640. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture and/or instruction set. For example, some of the cores 602A-N may be in order while others are out-of-order. As another example, two or more of the cores 602A-N may be capable of execution the same instruction set, while others may be capable of executing only a subset of that instruction set or a different instruction set.

The application processor 620 may be a general-purpose processor, such as a Atom™, Core™ i3, i5, i7, 2 Duo and Quad, Xeon™, Itanium™, XScale™ or StrongARM™ processor, which are available from Intel Corporation, of Santa Clara, Calif. Alternatively, the application processor 620 may be from another company, such as ARM Holdings, Ltd, MIPS, etc. The application processor 620 may be a special-purpose processor, such as, for example, a network or communication processor, compression engine, graphics processor, co-processor, embedded processor, or the like. The application processor 620 may be implemented on one or more chips. The application processor 620 may be a part of and/or may be implemented on one or more substrates using any of a number of process technologies, such as, for example, BiCMOS, CMOS, or NMOS.

Figure 7:
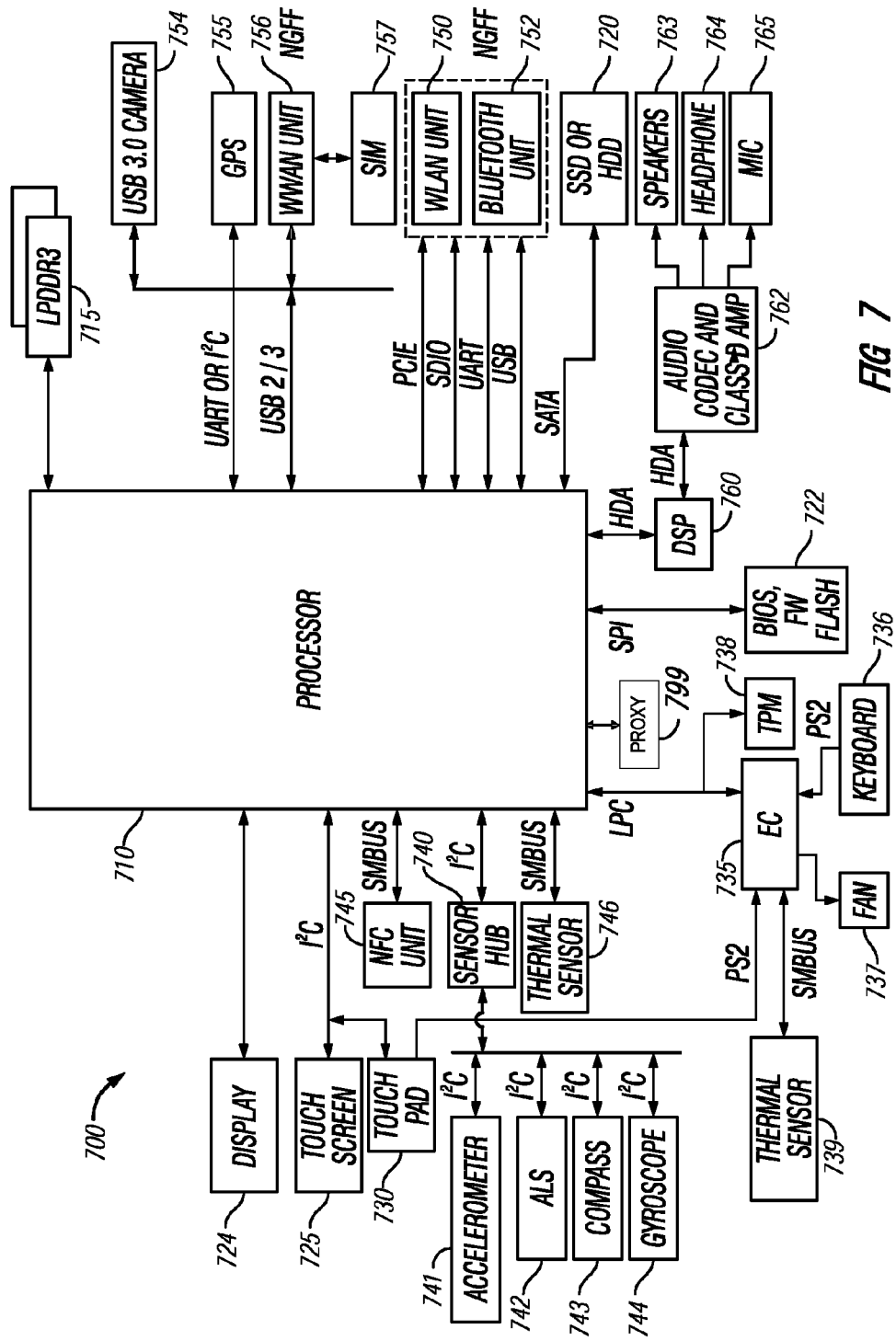
FIG. 7 is a block diagram of an embodiment of a SOC design in accordance with the present disclosure.

As seen in FIG. 7, a processor 710, in one embodiment, includes a microprocessor, multi-core processor, multi-threaded processor, an ultra low voltage processor, an embedded processor, or other known processing element. In the illustrated implementation, processor 710 acts as a main processing unit and central hub for communication with many of the various components of the system 700. As one example, processor 700 is implemented as a system on a chip (SoC). As a specific illustrative example, processor 710 includes an Intel® Architecture Core™-based processor such as an Atom™, i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 710 in one implementation will be discussed further below to provide an illustrative example.

Processor 710, in one embodiment, communicates with a system memory 715. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (1P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 720 may also couple to processor 710. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 7, a flash device 722 may be coupled to processor 710, e.g., via a serial peripheral interface (SPI). This flash device may provide for non-volatile storage of system software, including a basic input/output software (BIOS) as well as other firmware of the system.

Also shown in FIG. 7, a proxy 799 may be coupled to processor 710,

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 700. Specifically shown in the embodiment of FIG. 7 is a display 724 which may be a high definition LCD or LED panel configured within a lid portion of the chassis. This display panel may also provide for a touch screen 725, e.g., adapted externally over the display panel such that via a user's interaction with this touch screen, user inputs can be provided to the system to enable desired operations, e.g., with regard to the display of information, accessing of information and so forth. In one embodiment, display 724 may be coupled to processor 710 via a display interconnect that can be implemented as a high performance graphics interconnect. Touch screen 725 may be coupled to processor 710 via another interconnect, which in an embodiment can be an I$^2$C interconnect. As further shown in FIG. 7, in addition to touch screen 725, user input by way of touch can also occur via a touch pad 730 which may be configured within the chassis and may also be coupled to the same I$^2$C interconnect as touch screen 725.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920× 1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 710 in different manners. Certain inertial and environmental sensors may couple to processor 710 through a sensor hub 740, e.g., via an I$^2$C interconnect. In the embodiment shown in FIG. 7, these sensors may include an accelerometer 741, an ambient light sensor (ALS) 742, a compass 743 and a gyroscope 744. Other environmental sensors may include one or more thermal sensors 746 which in some embodiments couple to processor 710 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 7, various peripheral devices may couple to processor 710 via a low pin count (LPC) interconnect. In the embodiment shown, various components can be coupled through an embedded controller 735. Such components can include a keyboard 736 (e.g., coupled via a PS2 interface), a fan 737, and a thermal sensor 739. In some embodiments, touch pad 730 may also couple to EC 735 via a PS2 interface. In addition, a security processor such as a trusted platform module (TPM) 738 in accordance with the Trusted Computing Group (TCG) TPM Specification Version 1.2, dated Oct. 2, 2003, may also couple to processor 710 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 700 can communicate with external devices in a variety of manners, including wirelessly. In the embodiment shown in FIG. 7, various wireless modules, each of which can correspond to a radio configured for a particular wireless communication protocol, are present. One manner for wireless communication in a short range such as a near field may be via a near field communication (NFC) unit 745 which may communicate, in one embodiment with processor 710 via an SMBus. Note that via this NFC unit 745, devices in close proximity to each other can communicate. For example, a user can enable system 700 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 7, additional wireless units can include other short range wireless engines including a WLAN unit 750 and a Bluetooth unit 752. Using WLAN unit 750, Wi-Fi™ communications in accordance with a given Institute of Electrical and Electronics Engineers (IEEE) 802.11 standard can be realized, while via Bluetooth unit 752, short range communications via a Bluetooth protocol can occur. These units may communicate with processor 710 via, e.g., a USB link or a universal asynchronous receiver transmitter (UART) link. Or these units may couple to processor 710 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 756 which in turn may couple to a subscriber identity module (SIM) 757. In addition, to enable receipt and use of location information, a GPS module 755 may also be present. Note that in the embodiment shown in FIG. 7, WWAN unit 756 and an integrated capture device such as a camera module 754 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 760, which may couple to processor 710 via a high definition audio (HDA) link. Similarly, DSP 760 may communicate with an integrated coder/decoder (CODEC) and amplifier 762 that in turn may couple to output speakers 763 which may be implemented within the chassis. Similarly, amplifier and CODEC 762 can be coupled to receive audio inputs from a microphone 765 which in an embodiment can be implemented via dual array microphones (such as a digital microphone array) to provide for high quality audio inputs to enable voice-activated control of various operations within the system. Note also that audio outputs can be provided from amplifier/CODEC 762 to a headphone jack 764. Although shown with these particular components in the embodiment of FIG. 7, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 710 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 735. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, microarchitectural, debug state, and/or similar state variables associated with the processor.

The wakeup source signals from EC 735 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 7, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 8:
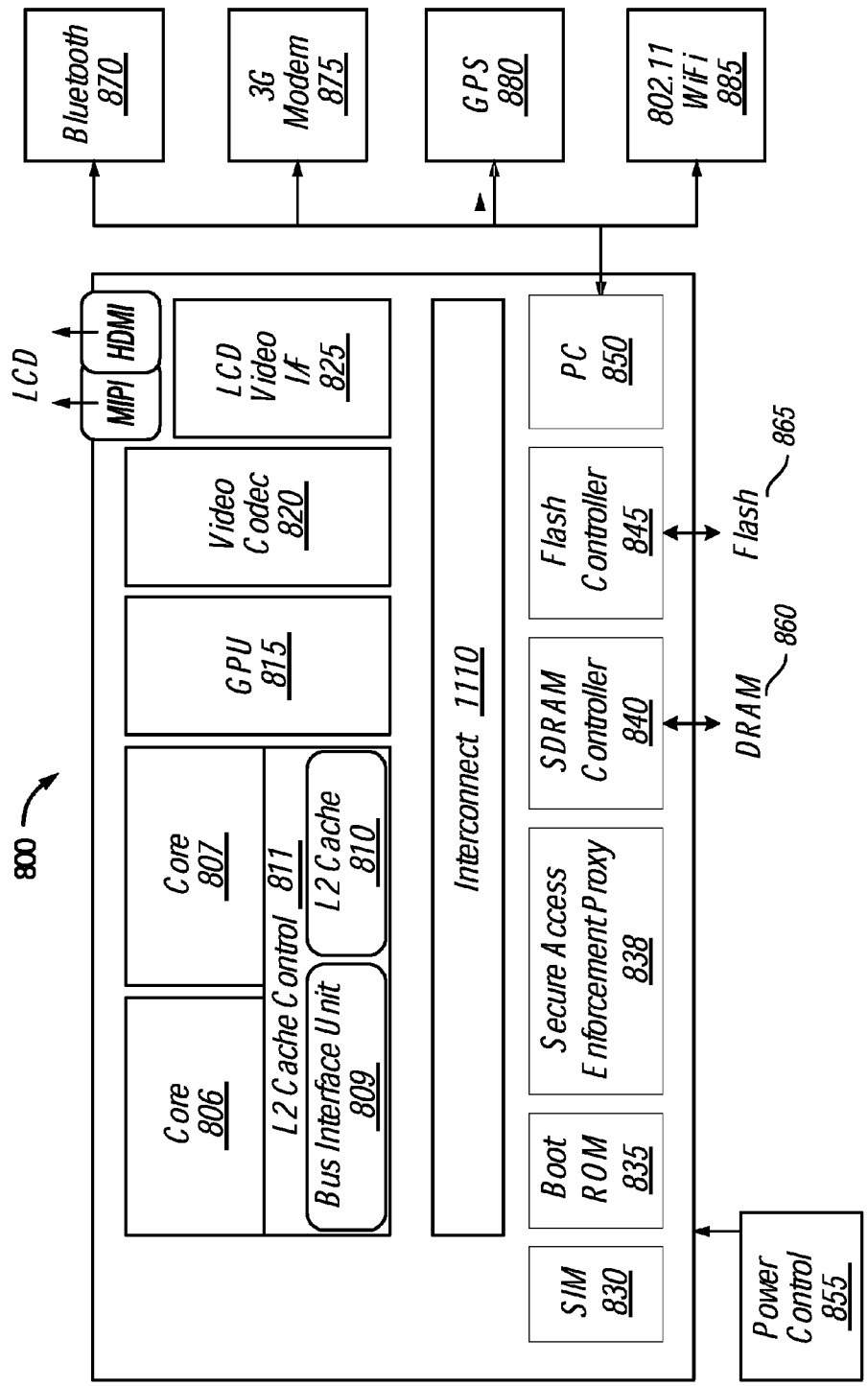
FIG. 8 is a block diagram of an embodiment of a SOC design in accordance with the present disclosure.

FIG. 8 is a block diagram of an embodiment of a system on-chip (SOC) design in accordance with the present disclosure. As a specific illustrative example, SOC 800 is included in communications equipment. In one embodiment, communications equipment refers to any device to support access to digital content, such as, and not limited to, a cable modem device, a gateway device, a gaming device, etc. In another specific illustrative example, SOC 800 is included in user equipment (UE). In one embodiment, UE refers to any device to be used by an end-user to communicate, such as a handheld phone, smartphone, tablet, ultra-thin notebook, notebook with broadband adapter, or any other similar communication device.

Here, SOC 800 includes 2 cores—806 and 807. Cores 806 and 807 may conform to an Instruction Set Architecture, such as an Intel® Architecture Core™-based processor, an Atom™-based processor, an Advanced Micro Devices, Inc. (AMD) processor, a MIPS-based processor, an ARM-based processor design, or a customer thereof, as well as their licensees or adopters. Cores 806 and 807 are coupled to cache control 811 that is associated with bus interface unit 809 and L2 cache 810 to communicate with other parts of system 800. Interconnect 812 includes an on-chip interconnect, such as an OCP (Open Core Protocol), AMBA (Advanced Microcontroller Bus Architecture), or other interconnect discussed above, which potentially implements one or more aspects of the described disclosure.

Interconnect 812 provides communication channels to the other components, such as a Subscriber Identity Module (SIM) 830 to interface with a SIM card, a boot ROM 835 to hold boot code for execution by cores 806 and 807 to initialize and boot SOC 800, a secure access enforcement proxy 838, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system 800 illustrates peripherals for communication, such as a Bluetooth module 870, 3G modem 875, GPS 880, and Wi-Fi 885. Note as stated above, a UE includes a radio for communication. As a result, these peripheral communication modules are not all required. However, in a UE, some form of radio for external communication is to be included.

Figure 9:
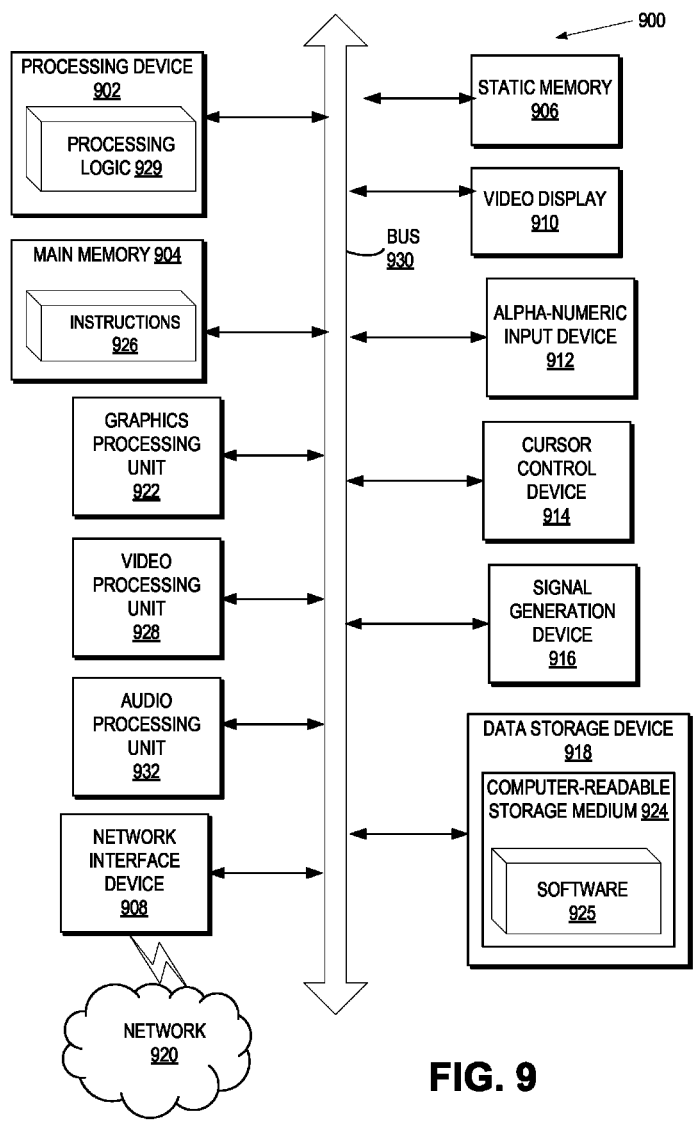
FIG. 9 illustrates a diagrammatic representation of a machine in the example form of a computer system within which a set of instructions, for causing the machine to perform any one or more of the methodologies discussed herein, may be executed.

FIG. 9 illustrates a representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processing device 902, a main memory 904 (e.g., read-only memory (ROM), flash memory, dynamic random access memory (DRAM) (such as synchronous DRAM (SDRAM) or DRAM, etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or more processing cores. The processing device 902 is configured to execute the processing logic 926 for performing the operations discussed herein. In one embodiment, processing device 902 is the same as computing system 100 of FIG. 1 that implements the secure access enforcement proxy 109. In another embodiment, processing device 902 implements the secure access enforcement proxy 201 of FIG. 2.

The computer system 900 may further include a network interface device 908 communicably coupled to a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a signal generation device 916 (e.g., a speaker), or other peripheral devices. Furthermore, computer system 900 may include a graphics processing unit 922, a video processing unit 928, and an audio processing unit 932. In another embodiment, the computer system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 924 on which is stored software 925 embodying any one or more of the methodologies of functions described herein. The software 925 may also reside, completely or at least partially, within the main memory 904 as instructions 926 and/or within the processing device 902 as processing logic 927 during execution thereof by the computer system 900; the main memory 904 and the processing device 902 also constituting computer-readable storage media.

The computer-readable storage medium 924 may also be used to store instructions 926 utilizing the secure access enforcement proxy, such as described with respect to FIG. 1, FIG. 2, FIG. 3, and FIG. 4, and/or a software library containing methods that call the above applications. While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a data processing system for securing transactions for shared resources comprising 1) a memory to store one or more policies that correspond to a plurality of subsystems; 2) a plurality of sets of registers corresponding to the plurality of subsystems; 3) a processor coupled to the plurality of sets of registers and memory to identify an original transaction command being sent from one of the plurality of subsystems to one of a plurality of shared resources; identify one of the policies that corresponds to the one of the plurality of subsystems; perform an action pertaining to the original transaction command based on the policy; and send a response to the one of the plurality of subsystems based on the action.

In Example 2, the plurality of subsystems of Example 1 can optionally comprise a plurality of untrusted agents.

In Example 3, the subject matter of Example 1 can optionally comprise the processor to create a replacement transaction command based on the policy; and send the replacement transaction command to the one of the plurality of shared resources.

In Example 4, the subject matter of Example 1 can optionally comprise the processor to perform the action by at least one of encrypting data, compressing data, denying the subsystem access to the shared resource, allowing the subsystem access to the shared resource, isolating data of the shared resource for the subsystem, certifying the subsystem, or translating a virtual location of the shared resource to a physical location of the shared resource.

In Example 5, the subject matter of Example 1 can optionally comprise the processor to determine whether to allow the one of the plurality of subsystems access to the one of the shared resources based on the policy.

In Example 6, the subject matter of Example 1 can optionally comprise the processor to determine to deny the one of the plurality of subsystems access to the one of the shared resources based on the policy; and deny the one of the plurality of subsystems access to the one of the shared resources.

In Example 7, the subject matter of Example 1 can optionally comprise the processor to send the response to the one of the plurality of subsystems by receiving an original transaction response from the one of the plurality of shared resources; creating a replacement transaction response based on the policy; and sending the replacement transaction response to the one of the plurality of subsystems.

In Example 8, the subject matter of Example 7 can optionally comprise the processor to create the replacement transaction response by at least one of encrypting data, compressing data, or translating a virtual location of the shared resource to a physical location of the shared resource.

In Example 9, the subject matter of Example 1 can optionally comprise the original transaction command to include a request for read or write access to data stored by the one of the plurality of shared resources.

In Example 10, the subject matter of Example 1 can optionally comprise a cache to store a plurality of stages of the original transaction command; and wherein the processor is to determine, for each of the plurality of stages, whether a current stage is dependent on a previous stage.

In Example 11, the subject matter of Example 1 can optionally comprise the processor to execute a programmable proxy agent and secure the programmable proxy agent from the plurality of subsystems.

In Example 12, the subject matter of Example 1 can optionally comprise the processor to determine that at least one of the plurality of subsystems is in a disabled state; and operate in a low power environment.

In Example 13, the subject matter of Example 1 can optionally comprise the processor to create one or more virtual features to emulate one or more features of a hardware interface of the one of the plurality of shared resources.

In Example 14, the subject matter of Example 1 can optionally comprise the processor to create a plurality of virtual features to emulate, for the each of the plurality of subsystems, a plurality of features of a plurality of hardware interfaces of the plurality of shared resources.

In Example 15, the subject matter of Example 14 can optionally comprise the processor to implement a different access policy for the individual virtual features of the plurality of features of the plurality of hardware interfaces.

Various embodiments may have different combinations of the operational features described above. For instance, all optional features of the apparatus described above may also be implemented with respect to the method or process described herein and specifics in the examples may be used anywhere in one or more embodiments.

Example 16 is a method for securing transactions for shared resources comprising 1) identifying an original transaction command being sent from one of a plurality of untrusted agents to one of a plurality of shared resources; 2) identifying a policy corresponding to the one of the plurality of untrusted agents; 3) performing an action pertaining to the original transaction command based on the policy; and 4) sending a response to the one of the plurality of untrusted agents based on the action.

In Example 17, the subject matter of Example 16 can optionally comprise creating a replacement transaction command based on the policy; and send the replacement transaction command to the one of the plurality of shared resources.

In Example 18, the subject matter of Example 16 can optionally comprise performing the action by at least one of encrypting data, compressing data, denying the subsystem access to the shared resource, allowing the subsystem access to the shared resource, isolating data of the shared resource for the subsystem, certifying the subsystem, or translating a virtual location of the shared resource to a physical location of the shared resource.

In Example 19, the subject matter of Example 16 can optionally comprise determining whether to allow the one of the plurality of untrusted agents access to the one of the shared resources based on the policy.

In Example 20, the subject matter of Example 16 can optionally comprise determining to deny the one of the plurality of untrusted agents access to the one of the shared resources based on the policy; and denying the one of the plurality of untrusted agents access to the one of the shared resources.

In Example 21, the subject matter of Example 16 can optionally comprise sending the response to the one of the plurality of untrusted agents by receiving an original transaction response from the one of the plurality of shared resources; creating a replacement transaction response based on the policy; and sending the replacement transaction response to the one of the plurality of untrusted agents.

In Example 22, the subject matter of Example 21 can optionally comprise creating the replacement transaction response by at least one of encrypting data, compressing data, or translating a virtual location of the shared resource to a physical location of the shared resource.

In Example 23, the subject matter of Example 16 can optionally comprise the original transaction command to include a request for read or write access to data stored by the one of the plurality of shared resources.

In Example 24, the subject matter of Example 16 can optionally comprise caching a plurality of stages of the original transaction command; and determining, for each of the plurality of stages, whether a current stage is dependent on a previous stage.

In Example 25, the subject matter of Example 16 can optionally comprise securing the programmable proxy agent from the plurality of untrusted agents.

In Example 26, the subject matter of Example 16 can optionally comprise determining that at least one of the plurality of untrusted agents is in a disabled state; and operating in a low power environment.

In Example 27, the subject matter of Example 16 can optionally comprise creating one or more virtual features to emulate one or more features of a hardware interface of the one of the plurality of shared resources.

In Example 28, the subject matter of Example 16 can optionally comprise creating, for the each of the plurality of untrusted agents, a plurality of virtual features to emulate a plurality of features of a plurality of hardware interfaces of the plurality of shared resources.

In Example 29, the subject matter of Example 28 can optionally comprise implementing a different access policy for individual virtual features of the plurality of features of the plurality of hardware interfaces.

Various embodiments may have different combinations of the operational features described above. For instance, all optional features of the method described above may also be implemented with respect to a non-transitory, computer-readable storage medium. Specifics in the examples may be used anywhere in one or more embodiments.

Examples 30-43 are a non-transitory, computer-readable storage medium including instructions that, when executed by a computing system, cause the computing system to perform the operations of Examples 16-29.

Various embodiments may have different combinations of the operational features described above. For instance, all optional features of the method described above may also be implemented with respect to an apparatus. Specifics in the examples may be used anywhere in one or more embodiments.

Examples 44-57 are a system for securing transactions for shared resources comprising means for executing the operations of Examples 16-29.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "performing," "sending," "creating," "encrypting," "compressing," "denying," "allowing," "isolating," "certifying," "translating," "receiving," "caching," "executing," "securing," "operating," "creating," "implementing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A data processing system comprising:
    a memory to store one or more policies that correspond to a plurality of subsystems, the plurality of subsystems comprising a plurality of untrusted agents;
    a plurality of sets of registers corresponding to the plurality of subsystems; and
    a processor, coupled to the memory and the plurality of sets of registers, to execute a programmable proxy agent isolated from the plurality of untrusted agents, wherein the programmable proxy agent is to:
        identify an original transaction command being sent from one of the plurality of untrusted agents to one of a plurality of shared resources;
        identify one of the policies that corresponds to the one of the plurality of untrusted agents;
        perform an action pertaining to the original transaction command based on the policy; and
        send a response to the one of the plurality of untrusted agents based on the action.

2. The data processing system of claim 1, wherein the processor is to perform the action by:
    creating a replacement transaction command based on the policy; and
    sending the replacement transaction command to the one of the plurality of shared resources.

3. The data processing system of claim 1, wherein to perform the action comprises at least one of encrypting data, compressing data, denying the untrusted agent access to the shared resource, allowing the subsystem untrusted agent access to the shared resource, isolating data of the shared resource for the untrusted agent, certifying the untrusted agent, or translating a virtual location of the shared resource to a physical location of the shared resource.

4. The data processing system of claim 1, wherein the processor is to send the response to the one of the plurality of untrusted agents by:
    receiving an original transaction response from the one of the plurality of shared resources;
    creating a replacement transaction response based on the policy, wherein creating comprises at least one of encrypting data, compressing data, or translating a virtual location of the shared resource to a physical location of the shared resource; and
    sending the replacement transaction response to the one of the plurality of untrusted agents.

5. The data processing system of claim 1, further comprising:
    a cache to store a plurality of stages of the original transaction command, and wherein the processor is further to determine, for each of the plurality of stages, whether a current stage is dependent on a previous stage.

6. The data processing system of claim 1, wherein the processor is further to:
    determine that at least one of the plurality of untrusted agents is in a disabled state; and
    operate in a low power environment.

7. The data processing system of claim 1, wherein the processor is further to:
    create, for each of plurality of untrusted agents, a plurality of virtual features to emulate a plurality of features of a plurality of hardware interfaces of the plurality of shared resources.

8. The data processing system of claim 7, wherein the processor is further to:
    implement a different access policy for individual virtual features of the plurality of features of the plurality of hardware interfaces.

9. A method comprising:
    identifying, by a processor executing a programmable proxy agent isolated from a plurality of untrusted agents, an original transaction command being sent from one of the plurality of untrusted agents to one of a plurality of shared resources;
    identifying a policy corresponding to the one of the plurality of untrusted agents;
    performing an action pertaining to the original transaction command based on the policy; and
    sending a response to the one of the plurality of untrusted agents based on the action.

10. The method of claim 9, wherein performing the action comprises:
    creating a replacement transaction command based on the policy; and
    sending the replacement transaction command to the one of the plurality of shared resources.

11. The method of claim 9, wherein performing the action comprises at least one of encrypting data, compressing data, denying the untrusted agent access to the shared resource, allowing the untrusted agent access to the shared resource, isolating data of the shared resource for the untrusted agent, certifying the untrusted agent, or translating a virtual location of the shared resource to a physical location of the shared resource.

12. The method of claim 9, further comprising:
    determining, by the processor, whether to allow the one of the plurality of untrusted agents access to the one of the shared resources based on the policy.

13. The method of claim 9, further comprising:
    determining, by the processor, to deny the one of the plurality of untrusted agents access to the one of the shared resources based on the policy; and
    denying the one of the plurality of untrusted agents access to the one of the shared resources.

14. The method of claim 9, wherein sending the response to the one of the plurality of untrusted agents comprises:
    receiving, by the processor, an original transaction response from the one of the plurality of shared resources;
    creating a replacement transaction response based on the policy; and
    sending the replacement transaction response to the one of the plurality of untrusted agents.

15. The method of claim 14, wherein creating the replacement transaction response comprises at least one of encrypting data, compressing data, or translating a virtual location of the shared resource to a physical location of the shared resource.

16. The method of claim 9, wherein the original transaction command is a request for read or write access to data stored by the one of the plurality of shared resources.

17. The method of claim 9, further comprising:
    caching a plurality of stages of the original transaction command; and
    determining, for each of the plurality of stages, whether a current stage is dependent on a previous stage.

18. The method of claim 9, further comprising:
    securing the programmable proxy agent from the plurality of untrusted agents.

19. The method of claim 9, further comprising:
    determining, by the processor, that at least one of the plurality of untrusted agents is in a disabled state; and
    operating, by the processor, in a low power environment.

20. The method of claim 9, further comprising:
    creating one or more virtual features to emulate one or more features of a hardware interface of the one of the plurality of shared resources.

21. The method of claim 9, further comprising:
    creating, for the each of the plurality of untrusted agents, a plurality of virtual features to emulate a plurality of features of a plurality of hardware interfaces of the plurality of shared resources.

22. The method of claim 21, further comprising:
    implementing a different access policy for individual virtual features of the plurality of features of the plurality of hardware interfaces.

23. A non-transitory, computer-readable storage medium including instructions that, when executed by a computing system, cause the computing system to perform operations comprising:
    executing, by a processor in the computing system a programmable proxy agent isolated from the plurality of untrusted agents, wherein the programmable proxy agent is to;
    identify an original transaction command being sent from one of a plurality of untrusted agents to one of a plurality of shared resources;
    identify a policy corresponding to the one of the plurality of untrusted agents;
    perform an action pertaining to the original transaction command based on the policy; and
    send a response to the one of the plurality of untrusted agents based on the action.

24. The storage medium of claim 23, wherein to perform the action comprises at least one of encrypting data, compressing data, denying the untrusted agent access to the shared resource, allowing the untrusted agent access to the shared resource, isolating data of the shared resource for the untrusted agent, certifying the untrusted agent, or translating a virtual location of the shared resource to a physical location of the shared resource.

* * * * *